United States Patent [19]
Landree

[11] 3,720,323
[45] March 13, 1973

[54] DEPTH-TYPE FILTER FOR OPERATION WITH HIGH DIFFERENTIAL PRESSURES ACROSS THE FILTER

[75] Inventor: Raymond L. Landree, Madison Heights, Mich.

[73] Assignee: The Bendix Corporation

[22] Filed: Nov. 10, 1969

[21] Appl. No.: 875,134

[52] U.S. Cl. ............................................... 210/493
[51] Int. Cl. ............................................. B01d 27/06
[58] Field of Search ........................... 210/493, 493 B

[56] References Cited

UNITED STATES PATENTS 3,013,667  12/1961  Jackson et al. ...................... 210/493
3,038,211  6/1962  Luedi ............................. 210/493 X Primary Examiner—Reuben Friedman
Assistant Examiner—F. F. Calvetti
Attorney—William L. Anthony, Jr. and Plante, Hartz, Smith & Thompson

[57]  ABSTRACT

A filter assembly having a pleated depth-type filter element bonded at each end portion to metallic end caps by a thermosetting bonding agent being improved by having a flexible reinforcing strip bonded to the downstream side of the end portions of the pleated filter media continuously along the pleats thereof such that the reinforcing strip and the area of bonding to the filter media extends substantially above the bonding agent. The reinforcing strip has a substantially greater shear strength than the filter material and a porosity not greater than the filter material.

14 Claims, 4 Drawing Figures

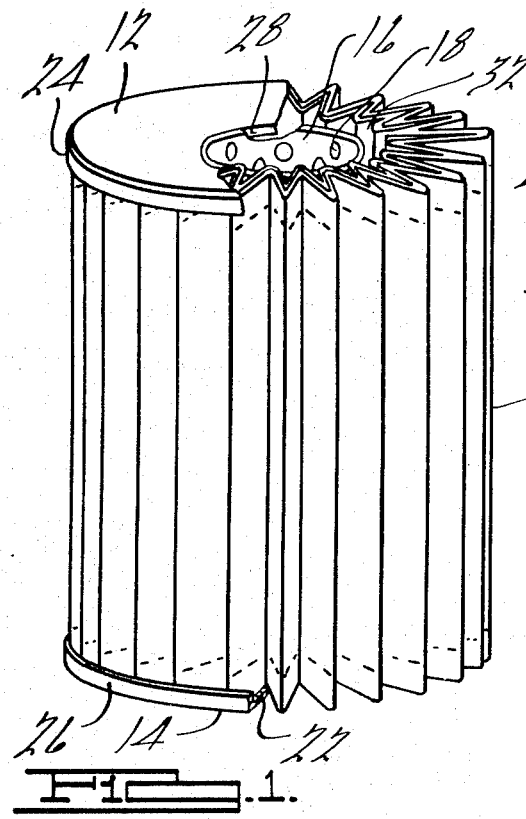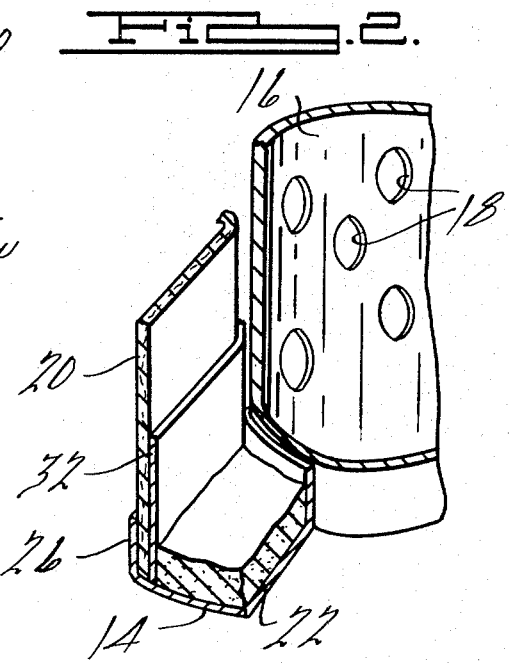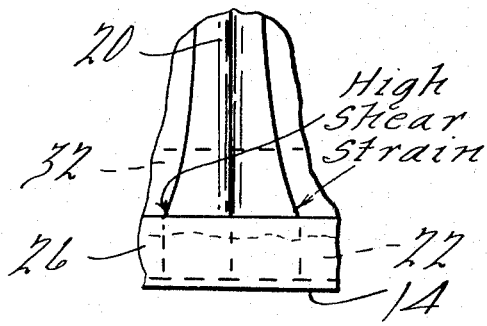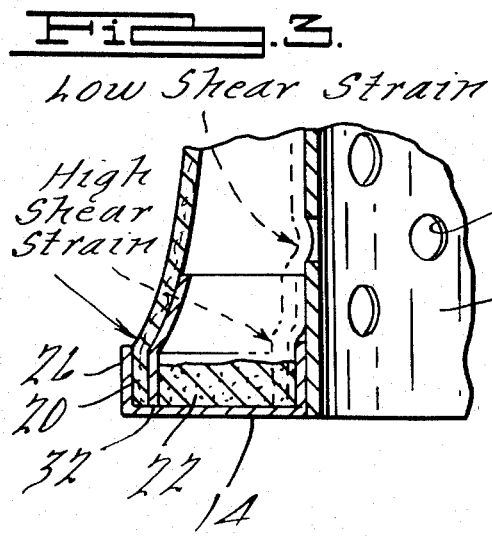
PATENTED MAR 13 1973　　3,720,323
FIG. 1.
FIG. 2.
FIG. 3.
FIG. 4.
Low Shear Strain
High Shear Strain
High Shear Strain
Flow
INVENTOR.
Raymond L. Landree
BY
William F. Anthony, Jr.
ATTORNEY.

DEPTH-TYPE FILTER FOR OPERATION WITH HIGH DIFFERENTIAL PRESSURES ACROSS THE FILTER

BACKGROUND OF THE INVENTION

1. Field of the Invention

Fluid filters and particularly pleated depth-type filters for operation with high differential pressures across the filter.

2. Description of the Prior Art

Filters for operation with high differential pressures across the filter generally use metallic mesh filtering material to obtain sufficient shear strength of the filtering material to withstand the forces on the filtering material caused by the high differential pressures. In some high pressure applications, the closing of valves and the like downstream of the filter has caused back pressure surges which result in reverse flexing of the porous metallic filter material. Over a large number of cycles, the reverse flexing of the porous metallic filter material has caused fatigue failures resulting in a loss of filtering capability, and more critically, the introduction of small pieces of metallic filter material into the fluid system which have a propensity to cause damage and malfunctioning of valves and other hydraulic components.

It will be appreciated that metallic mesh filters are surface-type filters, that is, the filtered matter or impurities are retained on the surface of the filter material. There has been a general trend in industry towards the use of depth-type filter elements, that is, filter elements which retain at least a portion of the filtered impurities in the interior of the filter material. Depth-type filters have increased impurity capacity with respect to surface-type filters thereby providing a corresponding increase in replacement intervals. However, depth-type filtering material is relatively fragile, and as such, has been unsuitable for use where high differential pressures across the filter are encountered because of likely shear failure of the filter material and consequent loss of filtering capability.

The U.S. Pat. to Jackson et al. No. 3,013,667, is of interest since it discloses a filter assembly having structural similarities to the filter assembly of this invention. The Jackson et al. filter, however, is only suitable for operation with low differential pressures across the filter element as evidenced by the thermoplastic end caps which are used to seal the ends of the pleated filter material. It will be appreciated by those skilled in the art that a thermoplastic end cap of the nature described in the Jackson et al. patent does not provide sufficient bond strength to prevent removal of the pleats or distortion of the end caps under high differential pressures, and consequent impairment of the filtering capabilities of the filter. The metallic strips fastened to the pleats of the Jackson et al. filter are used to provide compressive strength, and additionally, to serve as inductive heating elements. In essence, they are used to dispense with the requirements for a separate bonding agent and end cap. The metallic strips are not used for providing reinforcement to prevent shear failure caused by high pressure differentials across the filter.

SUMMARY OF THE INVENTION

The present invention provides a depth-type filter for operation with high differential pressures across the filter. The filter of this invention includes a pleated depth-type filter element having a reinforcing strip bonded along the end portions thereof. The filter element and reinforcing strip are bonded to the end cap utilizing a thermosetting bonding agent. The level of the bonding agent is preset so as to be substantially less than the height of the reinforcing strip. The reinforcing strip may be nonporous or have any porosity not greater than the porosity of the filter material. The reinforcing strip has a shear strength which is substantially greater than the shear strength of the filtering material and is sufficiently flexible to yield under the stress of a high differential pressure across the filter. The reinforcing strip minimizes shear fractures and prevents loss of filtering capability of the filter in the event of a fracture of the filter media at the critical shear area.

BRIEF DESCRIPTION OF THE DRAWINGS

FIG. 1 is a view of a filter assembly according to the present invention having a portion cutaway to more clearly illustrate the novel structure.

FIG. 2 is an enlarged view of a portion of the filter assembly of FIG. 1.

FIG. 3 is an enlarged cross-sectional view of a portion of the filter assembly of FIG. 1 as it would appear after it had been subjected to a high differential pressure.

FIG. 4 is an enlarged frontal view of a portion of the filter assembly of FIG. 1 as it would appear after it had been subjected to a high differential pressure.

DETAILED DESCRIPTION OF THE PREFERRED EMBODIMENT

In FIG. 1, a filter assembly 10 is shown including a top end cap 12, a bottom end cap 14, and a tubular central support 16 having a plurality of circular apertures 18 for flow of fluid therethrough. A pleated filter element 20 of porous depth-type filter material, formed in a generally tubular form with pleats extending axially thereof, is bonded to the metallic end caps 12 and 14 by a thermosetting bonding agent 22, for example, by an epoxy resin. A rigid thermosetting bonding agent 22, distinct from the end cap material, is required to seal and retain the end portions of the pleated filter element 20 when it is subjected to the forces caused by high differential pressures across the filter.

As can be seen in the drawings, the metallic end caps 12 and 14 are provided with outer walls 24 and 26, respectively, and inner walls 28 and 30 (FIG. 2), respectively, so as to form a recess for the pleated filter element 20 and a vessel for the thermosetting bonding agent 22 when it is in the liquid state during assembly.

The pleated filter element 20 is provided with a reinforcing metallic strip 32 bonded to the end portions of the pleated filter element 20 continuously along the pleats on the downstream side thereof. In this embodiment, the inside surface is disposed downstream. The metallic reinforcing strip 32 must be flexible, have a shear strength substantially greater than the shear strength of the pleated filtering material 20, and a porosity not greater than the porosity of the pleated filter material 20. For example, the reinforcing strip 32 may be nonporous shim stock or a porous metallic mesh. It is preferred to use a nonporous shim stock since that material is substantially lower in cost than metallic mesh.

The height of the reinforcing strip 32 with respect to the level of the bonding agent 22 is important. As can be seen in FIG. 2, the reinforcing strip 32 extends substantially above the level of the bonding agent 22. In one embodiment, 1.5 mil stainless steel shim stock having a width of three-quarters inch was used on a nonwoven, celluous or resin bound, cotton fiber filter element 20 having a height of 10 inches. The depth of the bonding agent 22 was approximately three-sixteenths inch.

The relationship between the level of the bonding agent 22 and the height of the reinforcing strip 32 can be better appreciated with reference to FIG. 3 in which a portion of the filter element 20 is shown deformed as a result of operation at high differential pressures. As can be seen in FIG. 3, the filter element 20 is displaced in the direction of flow at all points where it is not supported by a rigid structure.

Because of the rigid nature of the bonding agent 22 and the contrasting yieldable nature of the filter material 20, a first area of high shear strain occurs in the filter material 20 at the apex of the pleat immediately above the level of the bonding agent 22 as illustrated in FIG. 3. Because of the high shear strain, fracturing or tearing of the filter material 20 at the apex immediately above the bond level is not uncommon. It will be appreciated that if the filter material fractures, the filtering capability of the filter assembly is impaired.

A second area of high shear strain occurs at the trough of the pleat as illustrated in FIG. 3. This shear strain arises since it is not practical to construct a filter element such that all of the pleated material abuts the rigid tubular support 16 with the same compression as that which occurs during operation with high differential pressures. As a result, a spacing between the pleated filter element 20 and the tubular support 16 occurs as can be seen in FIG. 2. Under high pressure operation, the filter material 20 is forced substantially closer to the tubular support 16 thereby causing an area of high shear at the trough of the pleat which is sufficient to cause a fracture in the filter material and consequent loss of filtering performance.

High differential pressures across the filter also cause a squeezing effect of the pleats which creates a third area of high shear strain along the sides of the pleats immediately above the level of the bonding agent 22 as illustrated in FIG. 4.

A fourth area of shear strain exists about the holes 18 in the tubular support 16. However, since there is no rigid connection of the filter material in that vicinity such as that provided by the bond material, the filter material is allowed to "give" sufficiently to prevent localized points of high shear strain as previously described, thereby avoiding fractures of the filter material at the holes 18 in the tubular support 16.

From the above discussion, it will be appreciated that all of the areas of critical shear strain, that is, shear strain which may cause fracturing of the filtering material, are located above and in the immediate vicinity of the level of the bonding agent. As previously stated, a contrast exists between the rigid bond structure and yieldable filter material which is responsible for the critically high shear strain in that location.

The present invention provides a low cost method and apparatus for maintaining the original filtering capability of a filter which is to operate with high differential pressures by providing a reinforcing strip 32 bonded to the downstream surface of the filter element 20 at the end portions thereof. Both the width of the reinforcing strip 32 and the area of bond between the reinforcing strip 32 and the filter media 20 are selected such that they extend from within the bonding agent 22 to substantially above the level of the bonding agent so as to encompass the critical areas of high shear strain.

It is essential that the reinforcing strip 32 be flexible so that it yields with the filtering material 20 during operation at high differential pressures. As an example to illustrate this requirement, if the reinforcing strip 32 were rigid, an area of high shear strain would occur at the upper edge of the reinforcing strip 32 which would cause fracturing of the filtering material 20 at that location.

The reinforcing strip 32 smooths the transition of the filter material 20 from the bonding agent 22 where it is rigidly supported to the area immediately above the level of the bonding agent 22 where it is yieldably supported. The reduction in the severity of the transition lessens the shear strain of the filter material, and accordingly, lessens the possibility of a fracture of the filter material 20.

In the event that a fracturing of the filtering material 20 immediately above the level of the bonding agent 22 does occur, the integrity and the filtering capability of the filter assembly is maintained by the reinforcing strip 32. The shear strength of the reinforcing strip 32 is selected to be substantially higher than the shear strength of the filter material 20 to assure against fracture. Since the reinforcing strip 32 is bonded to the filtering material 20 to a height substantially above the level of the bonding agent 22, and furthermore since it has a porosity not greater than the filter material 20, a barrier to the passage of contaminants is provided even if a fracture of the filter material 20 occurs due to high shear strain.

In the manufacture of the filter assembly of this invention, the reinforcing strip 32 is bonded along opposite end portions of a sheet of porous depth-type filtering material. After bonding of the reinforcing strip 32 to the filtering material 20, the composite structure is pleated to provide pleats extending perpendicularly with respect to the reinforcing strip 32. The end portions of pleated filtering material 20 without the reinforcing strip 32 are abutted and bonded to provide a generally tubular form with the reinforcing strip 32 interior of the form. Thereafter, thermosetting bonding agent 22 is applied to one of the end caps 12 or 14 by introduction into the recess of the end cap to a level which is substantially less than the height of the reinforcing strip 32, and one end portion of the pleated filtering material 20 is positioned in the recess. Heat is applied to the thermosetting bonding agent 22 to cause it to harden. Once it has been hardened, reapplication of heat will not cause it to soften. The bonding process is repeated for the other end portion of the filter material 20 and the other end cap 12 or 14 to complete the assembly process.

In view of the above description, it will now be appreciated that the present invention provides a new filter assembly for operation with high differential pressures across the assembly which uses depth-type filtering material. As a result, a filter for operation with high differential pressures is provided which allows extended intervals between removal and replacement of the filter assembly by virtue of the high contaminant capacity of the depth-type filtering material. Additionally, the depth-type filtering material used with the filter of this invention has not experienced fatigue failures as encountered with wire mesh filters. For these reasons, the present filter is believed to be a significant improvement in the art.

While I have described a preferred embodiment of the present invention, it should be understood that various changes, adaptions, and modifications may be made therein without departing from the spirit of the invention and the scope of the appending claims.

Having thus described my invention, I claim:

1. A filter assembly for operation with high differential pressures across said filter assembly comprising:
   a pleated filter element of porous depth-type filtering material formed in a generally tubular form with its pleats extending axially thereof;
   an end cap having a recess of predetermined depth accepting said pleated filter element at an end portion thereof;
   a flexible reinforcing strip having a porosity not greater than said filtering material and a shear strength substantially greater than said filtering material bonded to said pleated filter element continuously along said pleats at said one end portion; and
   a bonding agent in said recess at a predetermined level for bonding said pleated filter element end portion to said end cap;
   said reinforcing strip extending into said bonding agent and having a predetermined width such that it extends substantially above said bonding agent level so as to flexibly support the filter material during filtering action for a substantial distance above the bonding agent level to prevent loss of filtering capability due to shear fractures of said filtering material in the immediate vicinity of said bonding agent level.

2. The filter assembly of claim 1 wherein said end cap consists of a metallic material.

3. The filter assembly of claim 1 wherein said bonding agent is a thermosetting agent.

4. The filter assembly of claim 1 wherein said bonding agent is an epoxy resin.

5. The filter assembly of claim 1 wherein said reinforcing strip is a metallic mesh.

6. The filter assembly of claim 1 wherein said reinforcing strip is nonporous.

7. The filter assembly of claim 6 wherein said reinforcing strip is a metal strip.

8. The filter assembly of claim 1 further including:
   a second end cap having a recess of predetermined depth for accepting said pleated filter element at the end portion thereof which is opposite said first-mentioned end portion;
   a second flexible reinforcing strip having a porosity not greater than said filtering material and a shear strength substantially greater than said filtering material bonded to said pleated filter element continuously along the pleats thereof at said opposite end portion; and
   a bonding agent in said recess of said second end cap for bonding said pleated filter element other end portion to said second end cap;
   said second reinforcing strip extending into said bonding agent and having a predetermined width such that it extends substantially above said bonding agent level so as to flexibly support the filter material during filtering action for a substantial distance above the bonding agent level to prevent loss of filtering capability due to shear fractures of said filtering material in the immediate vicinity of said bonding agent level.

9. The filter assembly of claim 8 wherein said second cap consists of a metallic material.

10. The filter assembly of claim 8 wherein said bonding agent for each of said end caps is a thermosetting agent.

11. The filter assembly of claim 8 wherein said bonding agent for each of said end caps is an epoxy resin.

12. The filter assembly of claim 8 wherein said reinforcing strips are constructed of metallic mesh material.

13. The filter assembly of claim 8 wherein said reinforcing strips are nonporous.

14. The filter assembly of claim 13 wherein said reinforcing strips are each a metal strip.

* * * * *